Dec. 4, 1951  S. SAUL, JR  2,577,276
PALLET RACK
Filed Sept. 24, 1948  2 SHEETS—SHEET 1
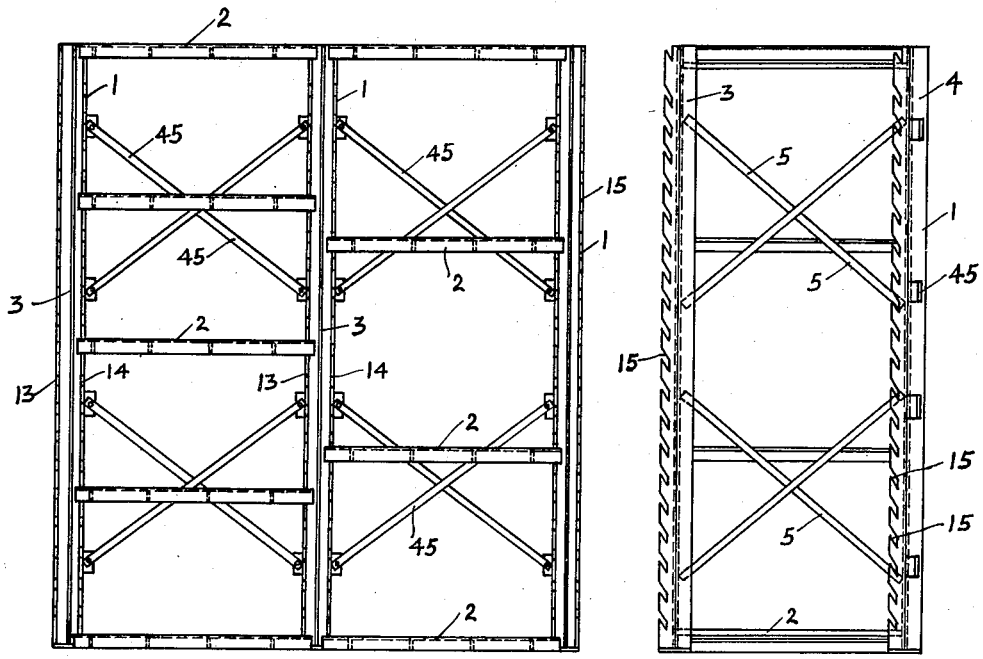
Fig.1.  Fig.2.
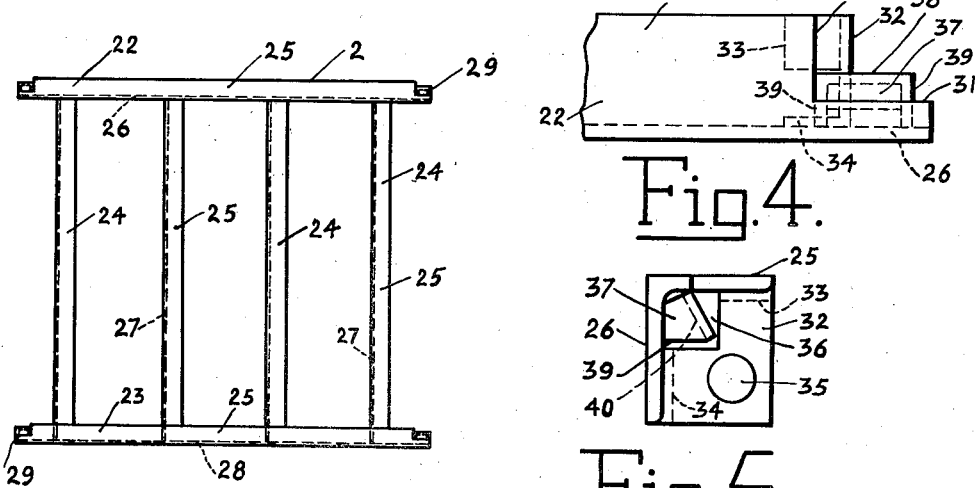
Fig.3.  Fig.4.
Fig.5.
INVENTOR.
SAMUEL SAUL JR.
BY
Christy, Parmelee, & Strickland
ATTORNEYS.

Dec. 4, 1951 S. SAUL, JR 2,577,276
PALLET RACK

Filed Sept. 24, 1948 2 SHEETS—SHEET 2

INVENTOR.
SAMUEL SAUL JR.
BY
Christy, Parmelee, & Strickland
ATTORNEYS.

Patented Dec. 4, 1951

2,577,276

UNITED STATES PATENT OFFICE 2,577,276

PALLET RACK

Samuel Saul, Jr., Pittsburgh, Pa., assignor to Reconstruction Finance Corporation, Cleveland, Ohio, a corporation of the United States Application September 24, 1948, Serial No. 50,956

5 Claims. (Cl. 211—147)

1

This invention relates to a storage rack for material handling pallets.

The use of pallets in connection with material handling operations has become increasingly common. Such pallets are provided with a material supporting surface which is elevated to provide space for the reception of the arms of a fork-lift truck for lifting and transporting the pallet and materials carried thereby. The pallets may be either of the flat type for handling articles which may be stacked thereon, or may be provided with collapsible side walls for containing articles of irregular shape therein. Either type is usually arranged so that the pallets and materials carried thereby may be stacked in superimposed relation to thereby occupy a minimum of space.

The use of pallets expedites the handling of materials and the stacking feature conserves space. However, in many cases, it is frequently necessary to have immediate access to the materials on a given pallet such as for the purpose of performing machining or working operations on such materials. In the event that the given pallet is in a stacked pile of pallets and located adjacent the bottom of the pile, it is necessary to remove the pallets overlying the given pallet before access thereto may be had. It is thereafter necessary to restack the pallets which were removed to provide access to the given pallet. Obviously, this condition results in a considerable expenditure of time, and an undesirable increase in the cost of the material handling operation.

In machine shops and other places where pallets are used for handling materials on which a series of working operations are to be performed, supporting structures having shelves providing individual supports for pallets have been employed in order to eliminate the handling cost due to the stacking and unstacking of a plurality of pallets incident to gaining access to a given pallet. By reason of the size of the pallets and the weight of the articles carried thereon, such structures must be very large and capable of carrying extremely heavy loads. Heretofore, such structures have been constructed of permanently connected shelves and supports which when once installed are incapable of being moved to another position. With such pallet structures, it is frequently necessary that a fork-lift truck used for moving the pallet travel a long distance in order to transport the materials to a point where the working operation is to be performed thereon. In order to avoid

2 the necessity of having a fork-lift truck travel over a long distance, it has been necessary to provide supporting structures of the character referred to located at strategic points thereby resulting in inefficient use of the permanent structures and the use of considerable floor space.

One of the principal objects of this invention is to provide a rack for storing loaded pallets in which the individual parts thereof may be readily taken apart and reassembled where needed.

Another object of this invention is to provide a rack for storing pallets in which the position of the pallet supporting shelves may be readily adjusted vertically to vary the space therebetween in accordance with the height of the materials on the pallets and to thereby utilize space more efficiently.

A further object of the invention is to provide a pallet rack having vertical supporting frames so arranged that each frame will provide a common support for pallet-supporting shelving on opposite sides thereof.

A still further object is to provide a pallet rack in which the pallet supporting shelving is employed to secure the vertical supporting frames therefor in spaced relation.

A still further object of the invention is to provide a pallet rack having pallet supporting shelving which is readily adjustable in a vertical direction with respect to vertically extending supports therefor.

Other objects and advantages of the invention will become apparent from the following description.

In the drawings there is shown a preferred embodiment of the invention. In this showing:

Fig. 1 is a front view of a pallet rack constructed in accordance with the principles of this invention;

Fig. 2 is a side elevational view of the rack shown in Fig. 1;

Fig. 3 is a top plan view of a pallet supporting shelf;

Fig. 4 is an enlarged fragmentary plan view of one corner of the shelf shown in Fig. 1;

Fig. 5 is a side elevational view looking from the right of Fig. 4;

Figure 6:
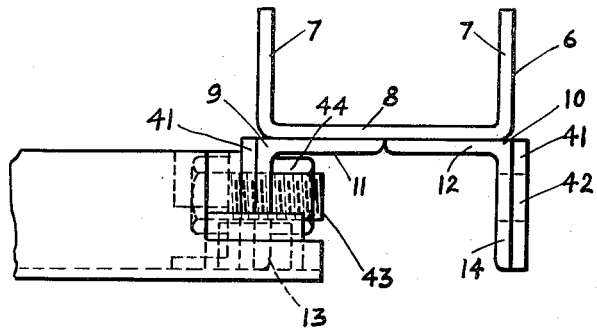
Fig. 6 is a fragmentary top plan view showing the manner in which one corner of a shelf is supported by a supporting standard.

Referring to Figs. 1 and 2 of the drawings, it will be noted that the rack comprises a plurality of vertical supporting frames 1 so arranged that each adjacent pair of frames provides a support for shelves 2 extending therebetween in a manner which will become apparent. The frames 1 are secured together by the shelves 2 in spaced relation, and the shelves 2 are adjustable vertically with respect to the frames 1. Each of the frames 1 comprises a pair of vertically extending supporting standards 3 and 4 which are secured together in spaced relation by bracing members 5 having welded connections at their ends to the supporting standards 3 and 4. In this manner each of the frames 1 is an integral unit comprising the vertical supporting standards 3 and 4 and the bracing member 5.

The structure of the supporting standards 3 and 4 will be best understood by referring to Fig. 6. In this showing, the numeral 6 designates a vertically extending U-shaped channel section having outwardly extending flanges 7 and a connecting web 8. A pair of L-shaped channel sections 9 and 10 are secured to the U-shaped channel section 6 with flanges 11 and 12 abutting against and welded to the web 8. The free flanges 13 and 14 of the angle sections 9 and 10 project outwardly from the section 6 and in a direction opposite to that of its flanges 7. The specific arrangement of the channels 6, 9, and 10 is desirable in that a rigid vertically extending supporting standard is provided thereby, and in which the flanges of the channels of the supporting standard reinforce the supporting standard against bending.

Figure 7:
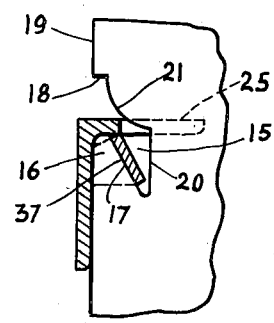
Fig. 7 is a fragmentary sectional view illustrating in detail the manner in which the supporting standards are notched to provide hooks for supporting the shelves.

As best shown in Figs. 1 and 2, the flanges 13 and 14 are provided with a plurality of notches 15 at spaced vertical intervals. The notches 15 preferably have a shape or contour as best shown in Fig. 7. From this showing it will be noted that each of the notches is formed to provide a hook 16 having a surface 17 tapering downwardly and inwardly from the tip of the hook 16. The upper edge of the notch 15 is formed to provide a flat surface 18 extending at right angles inwardly from the vertical edge 19 of the flange in which the notch is formed. The surface 18 is connected with the inner surface 20 of the notch 15 by a curved surface 21 for a purpose to be described.

As best shown in Figs. 3 through 5, each of the shelves 2 is formed from a plurality of L-shaped angle sections. Each of the shelves 2 comprises a pair of parallel angle sections 22 and 23 and a plurality of similar angle sections 24 extending between and at right angles to the sections 22 and 23. The sections 22, 23, and 24 are so arranged that each has a flange 25 lying in a common plane to provide a supporting surface for pallets to be carried thereby. Each of the sections 24 has one end connected to the depending flange 26 of the section 22 by welding. The flanges 25 at the other ends of the sections 24 are cut away so that the vertical flanges 27 may extend underneath the flange 25 of the section 23 into engagement with the vertical flange 28 of the section 23. The projecting ends of the flanges 27 are connected by welding to the flanges 28 and 25 of the section 23. The sections 22 and 23 have mounting members 29 at each end thereof thereby providing identical mounting members at each of the four corners of the shelf 2.

The structure of the mounting members 29 will be best understood by referring to Figs. 4 and 5. From this showing it will be noted that the horizontal flange 25 is cut away along the lines 30 and 31. A clip 32 having inwardly projecting flanges 33 and 34 welded to the flanges 25 and 26 is secured in position at right angles to the flanges 25 and 26. The clip 32 is provided with an opening 35 through which a mounting bolt may be passed in a manner to be described. The clip 32 is provided with a cut out part 36 through which a mounting clip 37 extends. The clip 37 comprises a body part 38 having inwardly turned ears 39 at the ends thereof. The ears 39 are connected to the vertical flange 26 by welding and the upper edge of the part 38 abuts against the undersurface of the flange 25 to which it is preferably secured as by welding. The clip 37 is so formed that the inner surface 40 thereof has a slope corresponding to the surface 17 of the hook 16. The clips 37 are receivable on the hooks 16 as best shown in Fig. 7. When the clips 37 are thus mounted on the hooks 16, the shelf to which the clips 37 are secured will be supported by the flanges in which the notches 15 are formed. The particular shape of the notches 15 will prevent accidental disengagement of the clips 37 by reason of a jarring action. In the event that the shelf is accidentally struck in a manner which would apply an upward force thereto to disengage the clip 17 from the hook 16, the curved surface 21 of the notch 15 will guide the flange 25 upwardly into engagement with the flat part 18. Further upward movement of the flange 25 will thus be prevented, and as soon as the force causing such upward movement is dissipated, the shelf will move downwardly into the position shown in Fig. 7.

In assembling the pallet rack, two of the frames 1 are placed in vertical position, and a pair of shelves 2 are placed with the clips 37 of the mounting members 29 over the hooks 16 on the adjacent flanges 13 and 14. When two of the shelves 2 are thus mounted on a pair of supporting frames 1, the shelves will be effective through the connecting members 29 to secure the frames rigidly together in spaced relation. It is preferred that the top and bottom shelves of the rack be bolted to the supporting standards 3 and 4. To this end, the top and bottom portions of each of the flanges 13 and 14 are provided with reinforcing members 41 welded thereto, and having an opening 42 extending through the part 41 and the flange to which it is connected. The opening 42 is so positioned that it will be aligned with the opening 35 in the reinforcing member 32 provided as part of the connection 29. A bolt 43 is then passed through the aligned openings 42 and 35, and a nut 44 is applied to the bolt 43 for securing the parts rigidly together. Only the top and bottom shelves 2 need be provided with reinforcing clips 32.

When two of the supporting frames 1 are secured in position by supporting shelves 22, an additional section of rack shelving may be provided by the use of one additional frame 1 and additional shelving 2. To form the additional section it is merely necessary to fasten shelving to the notched flange of the supporting frame 1 already in position, and to the notched flange of the frame 1 being added. In this manner, as many additional sections of rack shelving may be added as is required. It will be noted that, in such case, each of the frames 1 intermediate the end frames of the pallet rack will provide a common support for shelving on opposite sides thereof.

Figure 8:
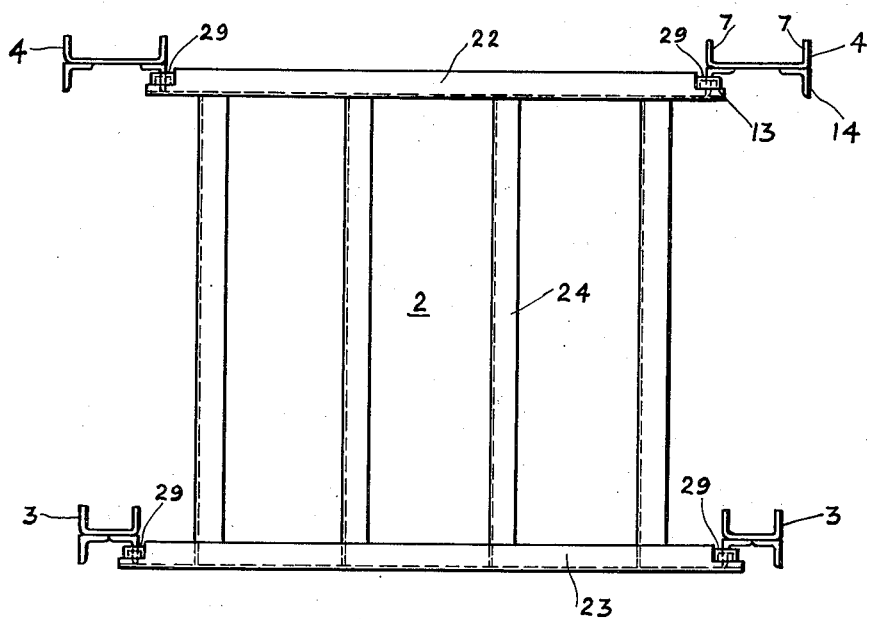
Fig. 8 is a top plan view illustrating a modified pallet rack support.

The modification shown in Fig. 8 is identical to the structure described above with the exception that the flanges 7 of the supporting standards 4 are spaced further apart to increase the distance between the flanges 13 and 14. This requires that the length of the angle section 22 be decreased to decrease the distance between the mounting members 29 at the ends thereof. This enables the mounting members 29 carried by the section 22 to pass between the supporting standards 3 with the shelving 2 in a horizontal position. With the structure shown in Fig. 8, the shelves 2 may be placed in a horizontal position on the arms of a fork-lift truck and moved directly inwardly thereby to a position for supporting engagement on the standards 3 and 4.

From the foregoing it will be apparent that there is provided a rack for storing loaded pallets which is rigid in construction, and which may be readily taken apart and reassembled in another position. Attention is particularly invited to the fact that the frames 1 and the shelving 2 provide rectangular openings at the front of the rack through which loaded pallets may be inserted and withdrawn from a position in which they are supported on the shelves 2, this movement being performed by the arms of a conventional fork-lift truck. Strips 45 are connected in position between the standards 4 at the rear of the rack for the purpose of limiting movement of the pallets to the rear of the rack. Attention is also directed to the fact that the structure of the supporting standards 3 and 4 and the shelf mounting structure 29 enables the vertical positions of the shelves to be readily adjusted with respect to their supporting standards 3 and 4. In this manner the size of the rectangular openings at the front of the rack and the space between the shelves may be readily adjusted in accordance with the height of the material on the pallets. This enables the most efficient utilization of the space occupied by the pallet rack. It will also be noted that the manner in which the shelf 2 operates to secure the frames together enables the rack to be formed of a minimum of parts with a minimum of material. The cost of constructing the rack is thereby reduced and it may be consequently assembled and taken apart with very little effort in a short time.

Although the shelf channels 22 and 23 have been described in the preferred embodiment as being rigidly connected together by the angle sections 24, it will be understood that the connecting channels 24 may be omitted and the channels 22 and 23 may be employed as a support for shelving mounted or loosely supported thereon. In such case, the channels 22 and 23 would still function to space and secure the vertical supports 3 together through the connecting members 29 at the ends thereof.

While I have illustrated and described one specific embodiment of my invention, it will be understood that this is merely by way of illustration, and that various changes and modifications may be made therein within the contemplation of my invention and under the scope of the following claims:

I claim:

1. A supporting rack comprising spaced parallel vertical supporting frames, each of said frames comprising a pair of vertically extending U-shaped channel sections respectively having a web provided with a pair of L-shaped channel sections welded thereto with free flanges extending in a common direction away from said webs and with said free flanges notched to provide hooks therealong, and bracing members securing said U-shaped channel sections together in spaced relation, and a plurality of shelves respectively having mounting elements at each of the four corners thereof, said mounting elements being receivable over the hooks on said supporting frames to mount the shelves on said frames, said shelves when mounted on said frames being effective to secure said frames rigidly together in spaced relation, the L-shaped sections at the rear of each of said frames being spaced apart a greater distance than those at the front, and the mounting elements at the rear corners of each shelf being spaced apart a distance less than the distance between the L-shaped sections at the front of adjacent frames to facilitate mounting the shelves on the frames.

2. A supporting rack for pallets and the like comprising spaced parallel vertical supporting frames, each of said frames including front and rear vertical uprights respectively having a pair of spaced forwardly projecting parallel flanges, each of said flanges having notches providing hooks at spaced intervals therealong, and a plurality of shelves respectively having mounting elements at each of the four corners thereof for supporting engagement with hooks on adjacent front and rear flanges of adjacent frames, the flanges on said rear uprights being spaced apart a greater distance than those on the front uprights, the mounting elements at the rear of each of said shelves being spaced apart a distance less than the distance between adjacent flanges on the front uprights of adjacent frames to facilitate the mounting of the shelves on said frames.

3. A supporting rack for pallets and the like comprising spaced parallel vertical supporting frames, each of said frames including front and rear vertical uprights respectively having a pair of spaced forwardly projecting parallel flanges, each of said flanges having notches providing hooks at spaced intervals therealong, and a plurality of shelves respectively having mounting elements at each of the four corners thereof for supporting engagement with hooks on adjacent front and rear flanges of adjacent frames, the flanges on said rear uprights being spaced apart a greater distance than those on the front uprights, the mounting elements at the rear of each of said shelves being spaced apart a distance less than the distance between adjacent flanges on the front uprights of adjacent frames to facilitate the mounting of the shelves on said frames, said mounting elements being formed to provide a pair of depending and oppositely facing surfaces adapted to be projected between the hooks of adjacent uprights and lowered vertically into engagement therewith to form an interlock.

4. A supporting rack for pallets and the like comprising a pair of spaced parallel vertically extending frames, each of said frames having at both its front and rear edge a flange projecting forwardly toward the front of the frame whereby said rack is provided with a vertically extending and forwardly projecting flange at each of its four corners, said flanges having notches at spaced intervals along their vertical lengths to provide a plurality of hooks at spaced intervals therealong, the two flanges at the rear of the rack being spaced apart a distance less than the two flanges at the front of the rack, and a plurality of shelves respectively having mounting elements at each of the four corners thereof for supporting engagement on hooks on each of said flanges, the mounting elements at the rear of each of said shelves being spaced apart a distance less than the distance between the flanges at the front of said frames to facilitate the mounting of said shelves thereon.

5. An adjustable supporting rack for heavily loaded receptacles comprising a frame having four parallel spaced uprights arranged in two pairs, one pair being forwardly of the other, each pair having a series of equally spaced upwardly pointing hooks thereon, and a shelf having front and rear structural sections the ends of which protrude beyond the sides of the shelf and of an overall length greater than the spacing between the hooks of one of said pairs of uprights, and fastening elements formed to provide a pair of depending and oppositely facing surfaces on the protruding ends of the front and rear sections, said elements being adapted to be projected between the hooks of adjacent uprights and lowered vertically into engagement therewith to form an interlock.

SAMUEL SAUL, Jr.

REFERENCES CITED

The following references are of record in the file of this patent:

UNITED STATES PATENTS

| Number | Name | Date |
|---|---|---|
| 360,547 | Winslow | Apr. 5, 1887 |
| 676,381 | Ball | June 11, 1901 |
| 798,514 | Krag | Aug. 29, 1905 |
| 1,577,066 | Medart et al. | Mar. 16, 1926 |
| 1,802,234 | Caramella | Apr. 21, 1931 |
| 1,855,242 | Jarvis | Apr. 26, 1932 |
| 2,316,892 | Saul | Apr. 20, 1943 |
| 2,447,704 | Kline | Aug. 24, 1948 |

FOREIGN PATENTS

| Number | Country | Date |
|---|---|---|
| 415,028 | Great Britain | Aug. 7, 1934 |